Figure 1:
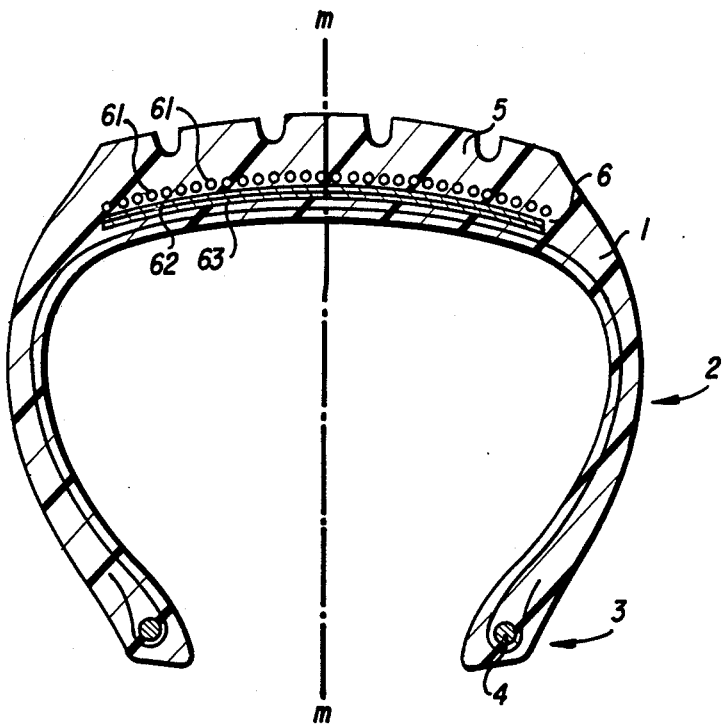
Figure 2:
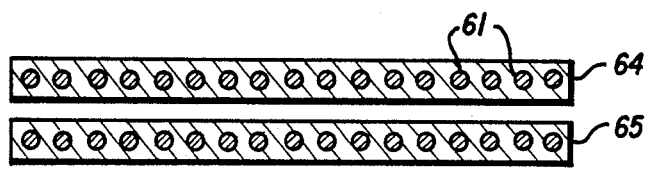

United States Patent [19]

Polvara et al.

[11] Patent Number: 4,949,770
[45] Date of Patent: Aug. 21, 1990

[54] BREAKER BELT STRUCTURE IN PNEUMATIC TIRES FOR VEHICLE WHEELS

[75] Inventors: Ornella Polvara; Alessandro Volpi, both of Milan, Italy

[73] Assignee: Pirelli Coordinamento Pneumatici S.p.A., Italy

[21] Appl. No.: 273,418

[22] Filed: Nov. 18, 1988

[30] Foreign Application Priority Data

Dec. 17, 1987 [IT] Italy ............................... 23056 A/87

[51] Int. Cl.$^5$ ............................................... B60C 9/18
[52] U.S. Cl. .................................... 152/531; 152/534; 152/536
[58] Field of Search ............... 152/531, 534, 535, 536, 152/537, 527, 532

[56] References Cited

U.S. PATENT DOCUMENTS

| | | | |
|---|---|---|---|
| 3,918,506 | 11/1975 | Marzocchi | 152/536 X |
| 4,483,381 | 11/1984 | Scriver | 152/527 X |
| 4,691,752 | 9/1987 | Kabe et al. | 152/531 X |
| 4,733,708 | 3/1988 | Kindry et al. | 152/531 X |
| 4,871,004 | 10/1989 | Brown et al. | 152/527 X |

OTHER PUBLICATIONS

L. H. Miner, *Modern Plastics Encyclopedia*, 1984–1985, Fibrous Reinforcements–Aramid, pp. 125–126, publish-.-McGraw Hill, NY, NY 1984.

*Primary Examiner*—Raymond Hoch
*Attorney, Agent, or Firm*—Stevens, Davis, Miller & Mosher

[57] ABSTRACT

The invention relates to a breaker belt structure to be used in pneumatic tires, in particular in those of the radial carcass type. The structure comprises a radially outer strip of circumferentially arranged cords (61), preferably but not exclusively made of textile material, as polyamide or aromatic polyamide, and two felted layers (62), (63), situated in a radially inner position, which comprise an elastomeric or plastomeric supporting material and a reinforcing filler of aramide pulp oriented along a preferred direction which is inclined with respect to the circumferential direction, the preferred directions of orientation in the two felted layers being preferably inclined symmetrically to each other at an angle of 45° with respect to said circumferential direction.

10 Claims, 1 Drawing Sheet

BREAKER BELT STRUCTURE IN PNEUMATIC TIRES FOR VEHICLE WHEELS

DESCRIPTION

The present invention concerns pneumatic tires for vehicles, in particular but not exclusively those for motor vehicles, which are provided with a radial carcass, at present too widely known to be further described in detail.

More specifically, the invention relates to the breaker belt structure situated on the carcass top, between the carcass and the tread band, which in radial tires is called "cincture", since it really has on the tire not only a protective action, as the conventional breakers of the crossed ply carcasses, but carries out a much more important "belting" function in respect of the carcass radial structure.

In other words, the breaker belt limits the circumferential expansion of the radial carcass under the thrust of the inflation pressure and of the centrifugal force, keeping the carcass itself within the pre-established dimensional values, and affects the behavior of the tire in use, in particular as regards tread wear and driving charcteristics.

The breaker belts usually adopted in pneumatic tires are composed of a plurality of radially superimposed strips of rubberized fabric, each reinforced with textile or metallic cords, said cords being arranged parallel to one another in each strip and being crossed with those of the adjacent strips, preferably symmetrically with respect to the circumferential direction of the tire.

Among the various strips forming the breaker belt, provision can be made of some strip in which the cords are arranged at 0°, i.e. are oriented along the tire circumferential direction; however, while many belt structures not provided with strips of cords at 0° have already been described, a belt structure formed only of strips haivng cords at 0° has always proved substantially inadequate to be employed in pneumatic tires, owing to the insufficient driving characteristics shown by them in use, due to the low rigidity to shear of such belt structure.

In fact, a good breaker belt must possess a high resistance to tension and compression in the circumferential direction and a high rigidity to shear to withstand the stresses originated in the tire by drift running or by the action of transversal axial thrusts.

The breaker belt provided with cords directed only in the circumferential sense, owing to the low modulus of the elastomeric or plastomeric material rubberizing the cords, shows a rigidity to shear, namely in the cross direction, which is quite insufficient in view of the expected performance, so that the tire in use is devoid of steering ability and lateral stability.

On the contrary, a good rigidity to shear is obtained with strips of cords inclined at angular values appropriately selected with respect to the tire circumferential direction; this rigidity increases, inter alia, according to the size of the reinforcing cords (number of wires and straight section of the wires) and to their thickness in the fabric, giving anyhow rise to some disadvantages, in particular as regards the comfort of the tire in use, its weight and its cost.

Many attempts were made to eliminate these inconveniences, as well as to strenghten the belting structure without increasing correspondingly the size of the reinforcing cords; in particular, the technicians' attention was mainly directed to the adoption of layers of elastomeric or plastomeric material reinforced with fibers, preferably oriented along a preferred direction, to be used in combination with said strips, or even of strips of cords where the same elastomeric material contains reinforcing fibers.

The greatest part of the known fibers, including natural, artificial, textile, metallic, chopped glass asbestos fibers, was tested in view of the above indicated use without anyhow giving a satisfactory solution of the problem in respect of the increase of rigidity to shear. In other words, neither the belting structures reinforced with fibers heretofore used were able to impart to the tire characteristics of quality and performance comparable with those of the conventional breaker belts, nor the fiber-reinforced layers were able to replace the usual strips of inclined cords.

In particular, as regards short textile fibers (nylon, rayon, natural fibers), the moduli of the layers and therefore their transversal rigidity are quite insufficient, while as regards steel fibers, these involve seriousn problems to be bonded to the supporting material, with the consequent development of tears, which cause the destruction of the layers; further, as regards glass, it adds to the problems pointed out in respect of steel, a scarce resistance to fatigue, an insufficient resistance to compression and serious risks for the operators' to safety during the working process.

Also the attempt to eliminate fibers and to build up layers made only of high modulus elastomeric or plastomeric material proved inadequate owing to the drawbacks due to the type of deformation (repeated flexions) to which the belting structure is subjected in consequence of the high hysteresis value of these high modulus materials and of the degradation of their degree of rigidity to shear when the tire is in use.

In fact, it is possible to obtain a belting structure sufficiently rigid to shear when it is unused, but is was demonstrated that said rigidity value cannot be maintained when the tire is working.

The present invention aims at providing a pneumatic tire having a belting structure in which the conventional strips of rubberized cord fabric are at least partially replaced by layers of elastomeric or plastormeric material reinforced with fillers of short textile fibers, said tire being able to give a performance which—as to quality—is not lower than those of the best conventional tires.

Accordingly, the subject matter of the present invention is a pneumatic tire for vehicle wheels which comprises a radial carcass, a tread band, provided with a raised pattern on its surface coming into contact with the ground and situated on the carcass top, sidewalls and beads for the anchorage of the tire on a corresponding assembling rim, and a breaker belt structure sandwiched between the tread band and the carcass, the tire being characterized in that said breaker belt structure comprises at least one strip of rubberized fabric reinforced with longitudinal cords and at least two layers of elastomeric or plastomeric material filled with aramide pulp, oriented in each layer along a preferred direction, with respect to the tire mid-circumferential plane, which has an opposite sense with respect to that of the other layer.

The present invention will be better understood from the following detailed description, given only by way of non-limiting example and made with reference to the attached sheets of drawings, in which:

FIG. 1 illustrates a cross section of a first embodiment of the tire according to the invention, and FIGS. 2, 3, 4 and 5 illustrate alternative embodiments of the breaker belt structure according to the invention, representing a constituting element of tire (1).

With reference to FIG. 1, a pneumatic tire in accordance with the invention comprises first of all—in a completely conventional manner—a carcass (1), preferably but not exclusively of radial type, provided with sidewalls (2) terminating, in a radially inner position, into beads (3), each reinforced with at least a circumferentially inextensible annular metal core (4), for the anchorage of the tire to a corresponding assembling rim.

On the top of said carcass, provision is made of a tread band (5) having on its radially outer surface an appropriate raised pattern to ensure to the tire in use all the necessary characteristics of road holding and gripping.

A breaker belt structure (6) is sandwiched between the tread band and the carcass ply or plies; it has approximately the same width as the tread and is substantially inextensible both circumferentially and axially.

According to the invention this structure comprises—from the tire outside towards its inside—a strip of rubberized fabric reinforced with cords (61) of suitable material, resistant at least to tension, and arranged circumferentially or at small angular values, substantially not greater than 10°, with respect to the tire mid-circumferential plane m—m.

The cords can be made of any appropriate material and in any case they are those conventionally used in the tires of the prior art to be arranged in the circumferential direction. The thickness of cords in the strip will be conveniently selected according to the type of cords adopted; for instance the cords of aramide (aromatic polyamide) will be distributed in the rubberized layer at a density of 60-100 cords/dm.

A pair of layers (62), (63) is situated in a radially inner position with respect to the above indicated strip; these layers are made of elastomeric or plastomeric material filled with aramide pulp, as for instance the "Kevlar-pulp" produced by Du Pont, which has been previously oriented along a preferred direction inclined with respect to the tire mid-circumferential plane, for instance through an appropriate stretching treatment carried out by means of a calendar; in particular, in said layers, the preferred direction has an opposite sense with respect to the tire mid-circumferential plane and preferably is also symmetrical to said plane, with which it forms an angle ranging between 20° and 70° and preferably equal to 45°. For the sake of clearness, in the following description these layers filled with aramide pulp will be defined as "felted".

The element forming the aramide pulp is a very short fiber (much shorter than the usual textile or metallic fibers employed to reinforce compounds and than the already known chopped glass), which has a fibrillar crystalline structure and differs from the above cited elements in that it carries on its surface and especially on its two ends a plurality of projecting fibrils which make it—so to say—"hairy". In fact, owing to said crystalline structure, the fiber rupture originates a tufting at the broken end.

By virtue of the intrinsic features of this material, the felted layer filled with aramide pulp shows very good properties of mechanical resistance, high rigidity in the direction of the preferred orientation of the pulp, i.e. of the orientation of said fibers, and a high value of the anisotropy ratio.

Moreover, the pulp itself has a very high resistance to ageing and shows very good bonding properties with respect to the elastomeric or plastomeric material in which it is embedded. In any case, however, said material must be carefully selected according to the following characteristics: dynamic modulus of high value, low hysteresis, i.e. low value of the loss factor (known to the technicians as "tan delta"), and good bonding properties as regards aramide.

Only by way of example, the Applicant reports herebelow the composition of an elastomeric material which has proved suitable to form the support for the aramide pulp.

| Ingredients | parts on 100 rubber parts |
|---|---|
| Natural rubber | 100 |
| Zinc oxide | 4 |
| Stearic acid | 2 |
| Antioxidizer (IPPD) | 2 |
| Resorcinol | 1 |
| Carbon black N 660 | 85 |
| Aromatic oil | 6 |
| Hexamethylenetetramine (HMT) | 1.4 |
| Vulcanization accelerator (MBS) | 1.5 |
| Vulcanization retarder (CTP) | 0.3 |
| Sulphur | 6 |

Said elastomeric composition, after the necessary tests, carried out at room temperature and at a frequency of 10 Hz, demonstrated to have the following characteristics:

| Dynamic modulus (Megapascal) | 17 Mpa |
|---|---|
| Loss factor (tan delta) | 0.11 |

Although the selection of the size and weight optimum values for the felted layers depends on the type and the real size of the tire to be produced, it is anyhow possible to define a series of critical values in respect of said parameters.

So, preferably, each felted layer will be filled with an amount (concentration) or aramide pulp ranging between 1 and 20 parts on 100 rubber parts; in the finished tire and with respect to its mid-circumferential plane, the pulp will have an orientation ranging between 20° and 70°.

The Applicant has found as particularly convenient a value of said orientation equal to 45° with respect to the tire mid-circumferential direction.

As regards car tires, each felted layer must have a thickness preferably ranging between 0.5 mm and 3 mm; said value can be much higher for motor transport tires. As to the basic elastormeric or plastomeric material, it must have a dynamic modulus higher than 8 Mpa (Megapascal) and a tan delta value not higher than 0.5.

Further, said basic material contains preferably some agents intended to facilitate its bonding to the aramide fibers, in particular resorcinol and hexamethylenetetramine or hexamethoxymethylmelamine.

As regards the position of the felted layers with respect to the strip of circumferential cords, various combinations are possible, besides that in which the pair of felted layers is arranged in radially inner position, as illustrated in FIG. 1.

First of all (see FIG. 2) it will be possible to embed into each felted layer a strip of cords at 0°, eliminating therefore the separate strip or—if the arrangement is seen from another standpoint—doubling the circumferential reinforcing element; in other words the breaker belt structure will comprise two radially superimposed felted layers (64), (65), each containing a plurality of reinforcing cords (61) arranged side-by-side and circumferentially oriented.

Figure 3:
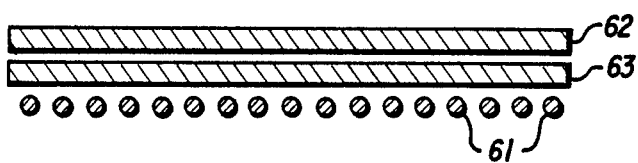
Figure 4:
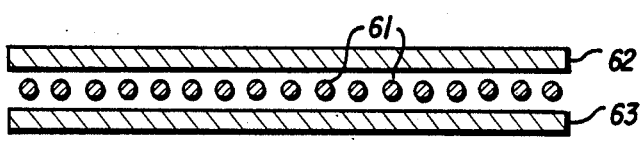
Figure 5:
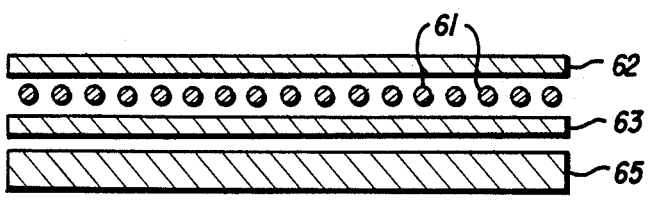

Still in connection with the pair of felted layers distinct from the strip or strips of cords at 0°, they can be situated in a radially outer position with respect to said strip or at opposite sides of the latter, as visible in FIGS. 3 and 4; further, the number of the felted layers may be greater than two and their thickness in a single breaker belt structure may be variable (FIG. 5), provided that the symmetrical behaviour of said structure is maintained constant by means of an appropriate balancing of the various features in the layers, i.e. concentration of the pulp, orientation of the fibers, modulus of the material and so on.

It is to be taken into account that a felted layer can be considered distinct from the adjacent one when in the two layers the value of at least one of the features indicated above for the basic elastomeric or plastomeric material and/or for the aramide pulp is substantially different, as for instance when in the two felted layers the concentration of pulp in the supporting material or the preferred orientation angle have different values.

It is now pointed out that the use of felted layers in accordance with the invention, in substitution of the strips of inclined cords, has completely eliminated all of the difficulties and disadvantages related to the employment of said strips, which, more precisely, are the sudden variation in the values of rigidity, flexibility and modulus of the tread band in its whole at the ends of the breaker belt strips, the need of staggering the strips' edges with respect to one another, and the possibility of initial detachments and tears between the strips or between them and the elastomeric material, which frequently take place, always at the breaker belt ends, in the conventional structures.

The pneumatic tire according to the invention has proved to be able to achieve the proposed aims, solving in an easy manner many problems ascertained in the prior art tires.

In particular, by virtue of the properties of the aramide pulp, associated to an appropriate supporting material, and to the cooperation of the strip of circumferentially arranged cords, in the tire of the invention the breaker belt structure has a very high modulus, optimum characteristics of longitudinal resistance and rigidity to shear, low flexional rigidity, relevant resistance to ageing and fatigue, so that the top profile of the tire remains substantially unaffected till to the complete wear of the tread band.

Moreover, the wearing action takes place slowly and regularly, and in particular the absence of an irregular wear at the tread band edges can be noted, probably owing to the elimination of the prejudicial "selvedge" effect remarked in the ends of the conventional breaker belt structures which—as already said—are built up with radially superimposed strips staggered at their edges, made of rubberized cord fabric and having their cords inclined with respect to the mid-circumferential plane.

The tire provided with the breaker belt structure in accordance with the invention demonstrates moreover to possess a better fatigue resistance, probably due to the improved mechanical stability of the structure, a reduced weight and a better comfort, owing to the low flexional rigidity of the breaker belt package and, surprisingly, said tire shows also a reduction in its rolling resistance, in comparison with the conventional values, with all the advantages offered by this feature in terms of cost saving.

Another advantage is related to the absence of metal cords in the structure, so that the problem regarding the oxidation of the metal and the bonding between the latter and the elastomeric material is solved at its origin.

Last but not least, the breaker belt structure according to the invention allows a reduction in the tire production costs consequent to the elimination of the semifinished products (strips) which involve high costs both for the use of valuable materials and for the number of operators necessary for their production and their assembling to the carcass of the tire being built up.

It is understood that the purpose of the present specification is purely illustrative and not restrictive, so that the invention will include in its scope any modification or alternative embodiment not expressly described but easily deducible, for any technician skilled in this field, from the above indicated inventive idea.

We claim:

1. A pneumatic tire for vehicle wheels which comprises a radial carcass, a tread band provided with a raised pattern on its surface for coming into contact with the ground and situated on the carcass radial outer surface, sidewalls and the beads for anchorage of the tire on a wheel rim, and a breaker belt structure sandwiched between the tread band and the carcass, the tire being characterized in that said breaker belt structure comprises at least one strip of rubberized fabric with longitudinal reinforcing cords lying at an angle of substantially 0° with respect to the mid-circumferential plane of said tire, and at least two layers of elastomeric material filled with aramide pulp oriented in each layer so as to lie at an angle with respect to said mid-circumferential plane, the cords in one layer lying in an opposite sense with respect to the angle of the other layer.

2. A pneumatic tire as in claim 1, in which said breaker belt structure comprises two aramide pulp felted layers arranged on the same radial side with respect to said strip of cords at substantially 0°.

3. A pneumatic tire as in claim 1, in which said breaker belt structure comprises two aramide pulp felted layers respectively arranged at opposite radial sides with respect to said strip of cords at substantially 0°.

4. A pneumatic tire as in claim 1, in which there are at least two said strips of rubberized fabric reinforced with longitudinally arranged cords each embedded into one of said aramide pulp felted layers.

5. A pneumatic tire as in claim 1, in which the angle of the aramide pulp in said at least two layers ranges between 20° and 70° with respect to the tire mid-circumferential plane.

6. A pneumatic tire as in claim 4, in which said angle of the aramide pulp in said at least two layers is symmetrical in the two layers with respect to said circumferential direction.

7. A pneumatic tire as in claim 1, in which the value of concentration of the aramide pulp in said at least one layer ranges between 1 and 20 parts on 100 rubber parts.

8. A pneumatic tire as in claim 1, in which said breaker belt structure comprises aramide pulp felted layers of different thickness.

9. A pneumatic tire as in claim 1, in which the elastomeric material supporting said aramide pulp felted layers has a dynamic modulus not lower than 8 Mpa and, at the same time, a tan delta value not higher than 0.5.

10. A pneumatic tire as in claim 1, in which the reinforcing cords in said at least one strip are made of aromatic polyamide.

* * * * *